Patented Apr. 20, 1937

2,077,831

UNITED STATES PATENT OFFICE 2,077,831

SULPHONIUM COMPOUNDS AND PROCESS OF MAKING THE SAME

Friedrich Felix, Basel, Switzerland, assignor to the firm of Society of Chemical Industry in Basle, Basel, Switzerland No Drawing. Application July 6, 1935, Serial No. 30,157. In Switzerland July 10, 1934

13 Claims. (Cl. 260—124)

This invention relates to the manufacture of valuable products of the general formula—

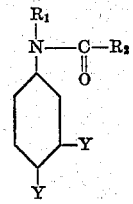

wherein $R_1$ represents hydrogen or alkyl and $R_2$ hydrogen, alkyl or aryl, wherein further one Y stands for hydrogen and the other Y for a sulphonium radical of the formula—

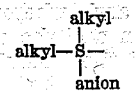

The alkyl radicals which are bound to the sulphur atom may be, for example, methyl, ethyl, propyl, isopropyl or butyl, or they may contain a higher number of carbon atoms, for instance they may be octyl, decyl, dodecyl, tetradecyl or hexadecyl.

Compounds of the above described general formula may be made, for example, by the action of an acylating agent on a thioether of an aromatic amine, for example an amine having the general formula—

wherein one Y stands for hydrogen, and the other Y for an —S—R-group, R representing any alkyl radical. As acylating agents fatty acids in general are applicable, for example formic acid, acetic acid, propionic acids, butyric acids, capric acids, and further, in particular, the acids of high molecular weight, such as lauric acid, propyl-undecyl-acetic acid, oleic acid, palmitic acid, stearic acid; natural and artificial mixtures of the acids may also be used. The acids are advantageously used in the form of their reactive derivatives, for example their halides, anhydrides or esters.

The invention consists in a process for treating compounds of the kind defined with alkylating agents. In this manner the compounds are converted into sulphonium compounds. Suitable alkylating agents are, in particular, the esters formed from inorganic acids and alcohols of low molecular weight, for example methyl-chloride, ethyl-chloride, propyl-chloride and the corresponding bromides and iodides, dimethylsulphate, diethylsulphate, further similarly constituted compounds, such as chloracetic acid, chloracetic esters, chloracetone, halogen-chlorhydrins or the like. An alkylating agent having a long carbon chain may also be used, for example the halides or sulphates of octyl, decyl, dodecyl, tetradecyl, or hexadecyl.

The salts of the new sulphonium compounds of the general formula—

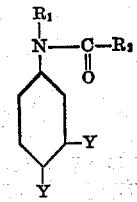

wherein $R_1$ represents hydrogen or alkyl and $R_2$ hydrogen, alkyl or aryl, wherein further one Y stands for hydrogen and the other Y for a sulphonium radical of the formula—

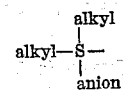

anion meaning a radical of an inorganic acid, this expression meaning also the radicals of acids, such as the monoalkylesters of the sulphuric acid are soluble in water and as a rule are not precipitated from such aqueous solutions by alkalies. The aqueous solutions of the salts have a high tendency to promote wetting; they have also a remarkable activity as emulsifying, dispersing, softening and cleansing agents. The new compounds may also be used as assistants in dyebaths, where they produce, particularly when used in comparatively very small proportions, dyeings which are excellently level and are distinguished by good exhaustion, combined in many cases with a high degree of fastness to light. This is especially the case with metal compounds dyeing in a sulphuric acid bath and wool dyestuffs dyeing in an acetic acid bath.

The new sulphonium compounds, so far as they contain suitable atomic grouping, such as aromatic nuclei or OH-groups, yield on treatment with sulphonating agents valuable new sulphonic acids or acid sulphuric acid esters which may be themselves valuable assistants, for example washing agents.

The following examples illustrate the invention, the parts being by weight:—

*Example 1*

139 parts of para-thioanisidine or the corresponding quantity of para-thiophenetidine are acylated, in presence of an acid binding agent, with 300 parts of oleic acid chloride in aqueous suspension or in an organic solvent, for instance benzene. The oleoyl-compound is worked up in the usual manner, dried and suspended in boiling benzene with addition of about 130 parts of dimethyl-sulphate. The boiling is continued until, on cooling a sample, practically everything remains in solution. The new sulphonium compound is then obtained by distilling the benzene. It is a salve-like to solid compound which dissolves in water to a foaming solution. The desired object is more quickly attained if, instead of the prescribed 130 parts about double that quantity of dimethyl-sulphate is used. After distilling the benzene the excess of dimethylsulphate may be withdrawn in a vacuum or decomposed by mixing the compound with aqueous ammonia.

Instead of the dimethylsulphate another methylating agent may be used, such as methylchloride, methylbromide, methyliodide, monomethylsulphate, etc. There are thus always obtained products of the formula—

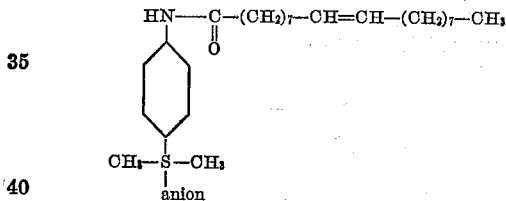

With diethylsulphate or ethylbromide or ethyl iodide products having similar properties as those described in the first paragraph of this example are obtained. Similarly behave also the products obtainable from m-thioanisidine.

When an alkylating agent of low boiling point is used the reaction is advantageously conducted in a closed vessel.

*Example 2*

321 parts of lauroylaminophenyl-4-thiomethylether are suspended in about 500 parts of benzene and there is added, while boiling, an excess of dimethylsulphate. After prolonged stirring, while boiling, in a reflux apparatus the new sulphonium compound is formed and may be obtained by distilling the benzene and excess of dimethylsulphate. The new compound of the formula—

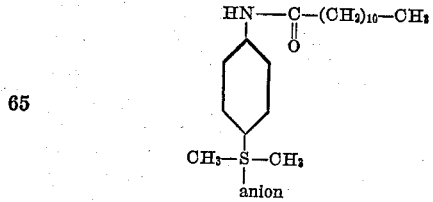

has properties similar to those described in Example 1. By the use of other alkylating agents, such as for example diethylsulphate or ethylchloride there are obtained sulphonium compounds having different alkyl-groups. Also here the 1:3-derivatives have similar properties.

*Example 3*

405 parts of stearoylaminophenyl-4-thiomethylether are treated as described in example with dimethylsulphate or methylchloride; the compound obtained is considerably more sparingly soluble in water but in most respects has properties similar to those of the product of Example 1 or 2. It corresponds to the formula—

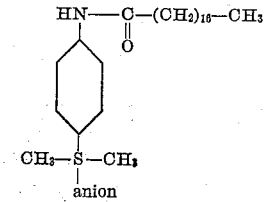

Also here the corresponding meta-compound has similar properties.

The treatment of the thioether with the alkylating agent is also possible without a solvent.

What I claim is:—

1. The sulphonium compounds of the general formula—

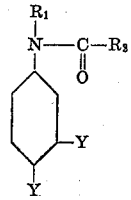

wherein $R_1$ represents a member of the group consisting of hydrogen and alkyl and $R_2$ represents a member of the group consisting of hydrogen, alkyl and aryl, wherein further one Y stands for hydrogen and the other Y for a sulphonium radical of the formula—

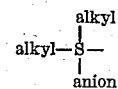

anion meaning a radical of an inorganic acid, which products constitute colorless masses soluble in water and in organic solvents.

2. The sulphonium compounds of the general formula—

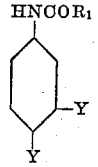

wherein $R_1$ represents a member of the group consisting of hydrogen, alkyl and aryl, wherein further one Y stands for hydrogen and the other Y for a sulphonium radical of the formula—

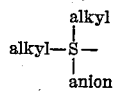

anion meaning a radical of an inorganic acid, which products constitute colorless masses soluble in water and in organic solvents.

3. The sulphonium compounds of the general formula—

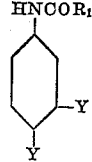

wherein $R_1$ represents alkyl, wherein further one

Y stands for hydrogen and the other Y for a sulphonium radical of the formula—

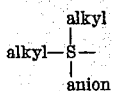

anion meaning a radical of an inorganic acid, which products constitute colorless masses soluble in water and in organic solvents.

4. The sulphonium compounds of the general formula—

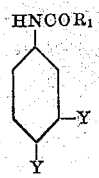

wherein $R_1$ represents an alkyl consisting of at least 9 carbon atoms, wherein further one Y stands for hydrogen and the other Y for a sulphonium radical of the formula—

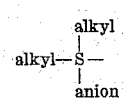

anion meaning a radical of an inorganic acid, which products constitute colorless masses soluble in water and in organic solvents.

5. The sulphonium compounds of the general formula—

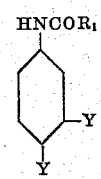

wherein $R_1$ represents an alkyl consisting of at least 9 carbon atoms in a straight chain, wherein further one Y stands for hydrogen and the other Y for a sulphonium radical of the formula—

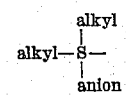

anion meaning a radical of an inorganic acid, which products constitute colorless masses soluble in water and in organic solvents.

6. The sulphonium compounds of the general formula—

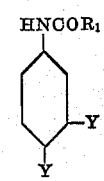

wherein $R_1$ represents an alkyl consisting of at least 9 carbon atoms in a straight chain, wherein further one Y stands for hydrogen and the other Y for a sulphonium radical of the formula—

each of whose alkyl radicals consists of not more than 2 carbon atoms, and anion meaning a radical of an inorganic acid, which products constitute colorless masses soluble in water and in organic solvents.

7. The sulphonium compound of the formula—

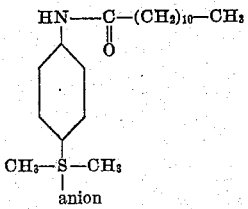

anion meaning a radical of an inorganic acid, which product constitutes a colorless mass soluble in water and in organic solvents.

8. The sulphonium compound of the formula—

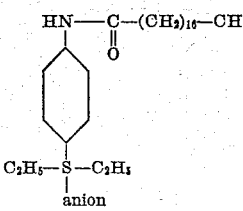

anion meaning a radical of an inorganic acid, which product constitutes a colorless mass soluble in water and in organic solvents.

9. The sulphonium compound of the formula—

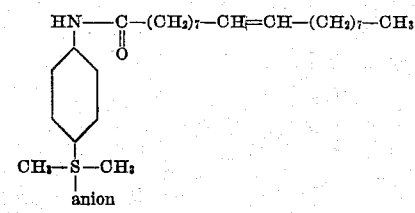

anion meaning a radical of an inorganic acid, which product constitutes a colorless mass soluble in water and in organic solvents.

10. Process for the production of sulphonium compounds of the general formula—

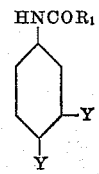

wherein $R_1$ represents a member of the group consisting of hydrogen, alkyl and aryl, wherein further one Y stands for hydrogen and the other Y for a sulphonium radical of the formula—

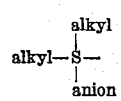

anion meaning a radical of an inorganic acid, consisting in treating compounds of the general formula—

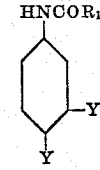

wherein $R_1$ represents a member of the group consisting of hydrogen, alkyl and aryl, wherein further one Y stands for hydrogen and the other Y for a radical of the general formula S—R, R meaning a member of the group consisting of hydrogen and alkyl, with alkylating agents.

11. Process for the production of sulphonium compounds of the formula—

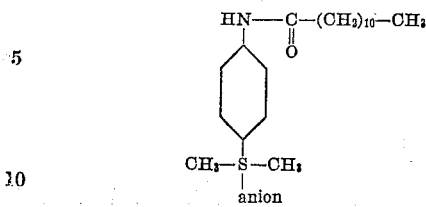

wherein anion represents a radical of an inorganic acid, comprising causing a methylating agent to react with a compound of the formula—

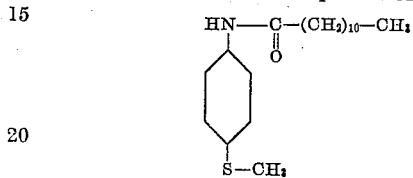

12. Process for the production of sulphonium compounds of the formula—

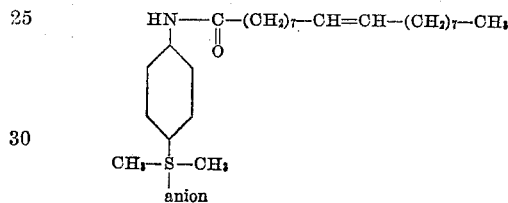

wherein anion represents a radical of an inorganic acid, comprising causing a methylating agent to react with a compound of the formula—

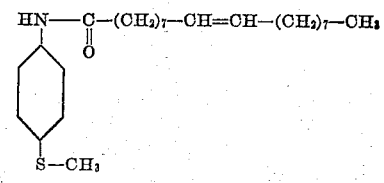

13. Process for the production of sulphonium compounds of the formula—

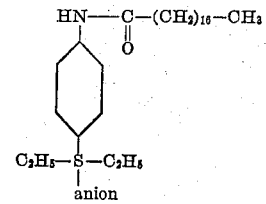

wherein anion represents a radical of an inorganic acid, comprising causing an ethylating agent to react with a compound of the formula—

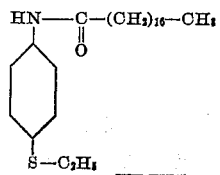

FRIEDRICH FELIX.